(12) United States Patent
Nishi

(10) Patent No.: US 10,488,984 B2
(45) Date of Patent: Nov. 26, 2019

(54) DATA TRANSMISSION SYSTEM, TOUCH PANEL APPARATUS AND DATA TRANSMISSION METHOD

(71) Applicant: FANUC CORPORATION, Yamanashi (JP)

(72) Inventor: Tohru Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 15/441,847

(22) Filed: Feb. 24, 2017

(65) Prior Publication Data
US 2017/0249052 A1 Aug. 31, 2017

(30) Foreign Application Priority Data
Feb. 25, 2016 (JP) ................................. 2016-034782

(51) Int. Cl.
G06F 3/041 (2006.01)
G06F 3/045 (2006.01)
(Continued)

(52) U.S. Cl.
CPC ............ *G06F 3/0418* (2013.01); *G06F 3/045* (2013.01); *G06F 3/0416* (2013.01); *G06F 21/00* (2013.01); *H04W 12/08* (2013.01)

(58) Field of Classification Search
CPC ...... G06F 3/0418; G06F 3/0416; G06F 3/045; G06F 21/00; H04W 12/08
(Continued)

(56) References Cited

U.S. PATENT DOCUMENTS 4,560,830 A * 12/1985 Perl .................... G06F 3/041
178/18.07
5,657,459 A * 8/1997 Yanagisawa .......... G06F 1/1632
345/169
(Continued)

FOREIGN PATENT DOCUMENTS

CN 1461452 A 12/2003
CN 102760007 A 10/2012
(Continued)

OTHER PUBLICATIONS

"Touchscreen," Wikipedia, Feb. 2, 2016, Retrieved from https://en.wikipedia.org/w/index.php?title=Touchscreen&oldid=904456170 (with English translation) 16 pages.
(Continued)

Primary Examiner — Kent W Chang
Assistant Examiner — Sujit Shah
(74) Attorney, Agent, or Firm — RatnerPrestia

(57) ABSTRACT

A data transmission system is disclosed, which transmits data via a touch panel capable of detecting vibrations, the system having: a portable apparatus including a vibration conversion unit configured to convert arbitrary data into a vibration signal, and a vibration generation unit configured to generate vibrations corresponding to a pattern of the vibration signal; and a touch panel apparatus including a resistive film-type touch panel configured to input the vibrations upon receiving a contact of the portable apparatus, a signal conversion unit configured to convert, into a detection signal, a voltage level detected corresponding to a contact and a non-contact between resistive films of the resistive film-type touch panel based on the inputted vibrations, and a data detection unit configured to detect the data based on a pattern of the detection signal.

6 Claims, 7 Drawing Sheets

(51) Int. Cl.
*G06F 21/00* (2013.01)
*H04W 12/08* (2009.01)

(58) Field of Classification Search
USPC .................................................. 345/173–179
See application file for complete search history.

(56) References Cited

U.S. PATENT DOCUMENTS

| | | |
|---|---|---|
| 6,630,929 B1 | 10/2003 | Adler et al. |
| 10,031,634 B2 | 7/2018 | Oda et al. |
| 2010/0051356 A1* | 3/2010 | Stern .................. G06F 3/03545 178/19.04 |
| 2012/0272288 A1* | 10/2012 | Ashbrook ............... G06F 21/32 726/1 |
| 2012/0278031 A1* | 11/2012 | Oda ...................... G06F 3/0416 702/150 |
| 2014/0028592 A1* | 1/2014 | Wang ................. G06F 3/03545 345/173 |
| 2014/0333553 A1* | 11/2014 | Yun ........................ G06F 3/016 345/173 |
| 2017/0118542 A1* | 4/2017 | Bernhardt ................ H04Q 9/00 |

FOREIGN PATENT DOCUMENTS

| | | |
|---|---|---|
| JP | H02-143316 A | 6/1990 |
| JP | 2876630 B2 | 3/1999 |
| JP | 2000183828 A | 6/2000 |
| JP | 2006-11763 A | 1/2006 |
| JP | 2011205551 A | 10/2011 |
| JP | 2012205294 A | 10/2012 |
| JP | 2013074432 A | 4/2013 |
| JP | 2014123789 A | 7/2014 |
| JP | 2014-174650 A | 9/2014 |
| JP | 2015079355 A | 4/2015 |
| WO | 0242992 A1 | 5/2002 |

OTHER PUBLICATIONS

"Coding Theory," Wikipedia, Feb. 3, 2016, Retrieved from https://en.wikipedia.org/w/index.php?title=Network_packet&oldid=901526504 (with English translation) 5 pages.

"Network packet," Wikipedia, Apr. 9, 2015, Retrieved from https://en.wikipedia.org/w/index/php?title=Coding_theory&oldid=904988770#Channel_coding (with English translation) 12 pages.

* cited by examiner

RECEIVE SAME DATA BY ITERATING MESSAGE MULTIPLE TIMES

DATA TRANSMISSION SYSTEM, TOUCH PANEL APPARATUS AND DATA TRANSMISSION METHOD

BACKGROUND OF THE INVENTION

1. Field of the Invention

The present invention pertains to a data transmission system that transmits arbitrary data via a touch panel capable of detecting vibrations. The present invention further pertains to a touch panel apparatus that detects the arbitrary data via the touch panel capable of detecting the vibrations, and also to a data transmission method of transmitting the arbitrary data via the touch panel capable of detecting the vibrations.

2. Description of the Related Art

Known conventional touch panels are of a resistive film type which detect a touch position corresponding to a voltage level induced upon a contact between two resistive films, and of an electrostatic capacity type which detect the touch position corresponding to a change in an electrostatic capacity between a fingertip and a conductive film. Further, the following Patent documents disclose a variety of technologies, each using a touch panel capable of detecting vibrations.

Japanese Patent Application Laid-Open Publication No. H02-143316 describes an apparatus configured to input a coordinate by inputting a vibration of a pen to a touch sensor. According to such an apparatus, the specified coordinate is inputted to the apparatus.

Japanese Patent Publication No. 2876630 describes an apparatus configured to recognize a command not only by inputting the coordinate in a way that inputs the vibration of the pen to the touch sensor but also by determining whether the vibration is caused or not. According to such an apparatus, the specified command is recognized by the apparatus.

Japanese Patent Application Laid-Open Publication No. 2006-11763 describes an apparatus configured to recognize a command, based on which vibration sensor an impact is inputted to by providing the vibration sensors at different portions.

Japanese Patent Application Laid-Open Publication No. 2014-174650 describes an apparatus configured to input data corresponding to a frictional vibration generated from a rugged pattern by providing the rugged pattern on the surface. Such an apparatus is configured to input the specified data corresponding to the specified rugged pattern.

SUMMARY OF THE INVENTION

The conventional technology of transmitting the data via the touch panel capable of detecting the vibrations, enables the input of the specified data having a comparatively small data size, but cannot input arbitrary data having a comparatively large data size and an arbitrary command. Further, the transmission of the arbitrary data to the touch panel apparatus entails extending wireless communication, e.g., Bluetooth (registered trademark) and a wireless LAN, or using wired communication, e.g., a USB connection and a wired LAN.

However, wireless communication is not simply connectable because of entailing connection settings beforehand. Moreover, in an environment instanced by a factory using the touch panel apparatus, it is preferable not to use a wireless connection, for reasons of a bad environment of radio waves and a risk of a leakage of information.

On the other hand, wired communication involves using a universal input/output interface and therefore enables unauthorized devices to connect with the touch panel apparatus. Accordingly, the wired connection can have weak security.

Such being the case, there is demanded a technology for transmitting the arbitrary data from a portable apparatus to the touch panel apparatus easily and safely, and reducing an error of the data detected by the touch panel apparatus.

A first aspect of the present invention provides a data transmission system configured to transmit data via a touch panel capable of detecting vibrations, having: a portable apparatus including a vibration conversion unit configured to convert arbitrary data into a vibration signal, and a vibration generation unit configured to generate vibrations corresponding to a pattern of the vibration signal; and a touch panel apparatus including a resistive film-type touch panel inputting the vibrations upon receiving a contact of the portable apparatus, a signal conversion unit configured to convert, into a detection signal, a voltage level detected corresponding to a contact and a non-contact between two resistive films of the resistive film-type touch panel based on the inputted vibrations, and a data detection unit configured to detect the data based on a pattern of the detection signal.

A second aspect of the present invention provides the data transmission system according to the first aspect, in which the portable apparatus further includes a vibration change unit configured to change a period or an amplitude of the vibrations, and the touch panel apparatus further includes a vibration specifying unit configured to specify a period or amplitude of the vibrations as to minimize errors of the detected data in multiple types of vibrations changed by the vibration change unit.

A third aspect of the present invention provides the data transmission system according to the second aspect, in which the vibration conversion unit generates a plurality of packets from the arbitrary data, based on a predetermined vibration pattern, generates a message containing the plurality of packets, and generates the vibration signal with the same message being iterated multiple times.

A fourth aspect of the present invention provides the data transmission system according to the third aspect, in which the vibration change unit changes the period or the amplitude of the vibrations for each message.

A fifth aspect of the present invention provides the data transmission system according to the third aspect, in which the data detection unit performs, when unable to detect valid data from the message, a trial of detecting the valid data from another identical message.

A sixth aspect of the present invention provides a touch panel apparatus configured to detect data via a touch panel capable of detecting vibrations, having: a resistive film-type touch panel capable of inputting the vibrations having a vibration pattern corresponding to arbitrary data; a signal conversion unit configured to convert, into a detection signal, a voltage level detected corresponding to a contact and a non-contact between resistive films of the resistive film-type touch panel based on the inputted vibration; and a data detection unit configured to detect the data based on a pattern of the detection signal.

A seventh aspect of the present invention provides a data transmission method for transmitting data via a touch panel capable of detecting vibrations, having: a step of causing a portable apparatus to convert arbitrary data into a vibration signal, and to generate vibrations corresponding to a pattern of the vibration signal; a step of inputting the vibrations to a resistive film-type touch panel by bringing the portable apparatus into contact with the resistive film-type touch panel; a step of converting, into a detection signal, a voltage level detected corresponding to a contact and a non-contact between resistive films of the resistive film-type touch panel based on the inputted vibrations; and a step of detecting the data based on a pattern of the detection signal.

DETAILED DESCRIPTION

Figure 1:
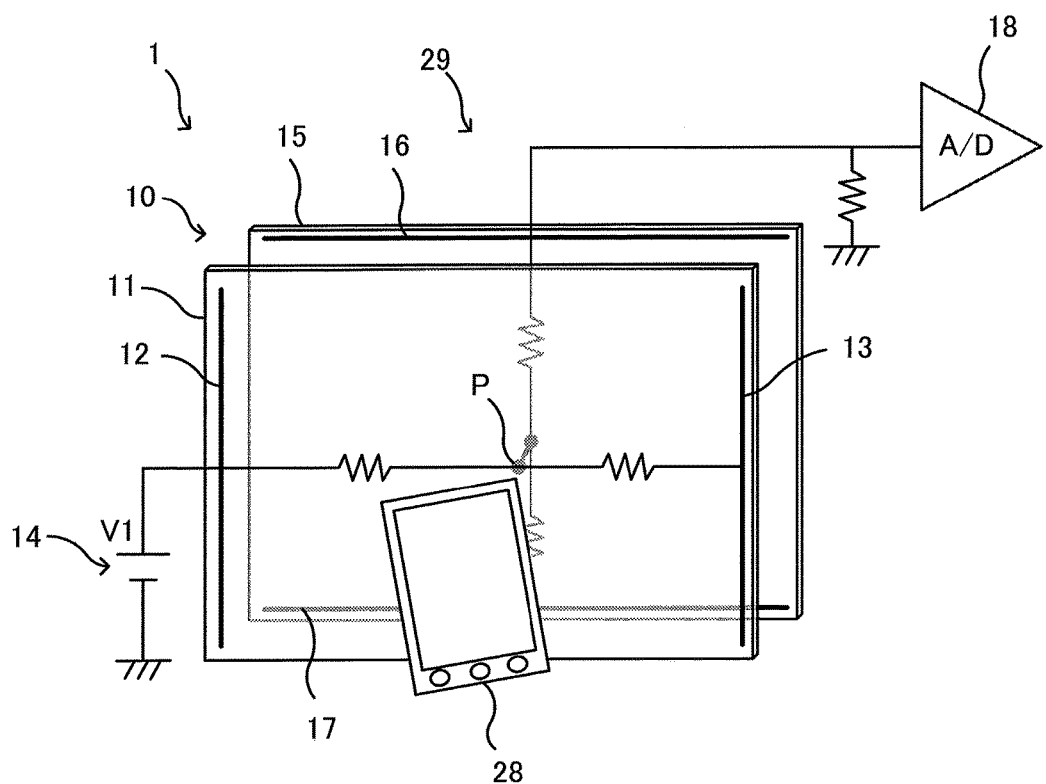
FIG. 1 is a schematic diagram illustrating an exemplary data transmission system in one embodiment of the present invention.

An embodiment of the present invention will hereinafter be described in detail with reference to the accompanying drawings. In the drawings throughout, the same components are marked with the same symbols and numerals. Note that contents to be described hereinafter limit neither a technical range of the invention described in the scope of claims nor significances, etc., of terminologies.

Figure 6:
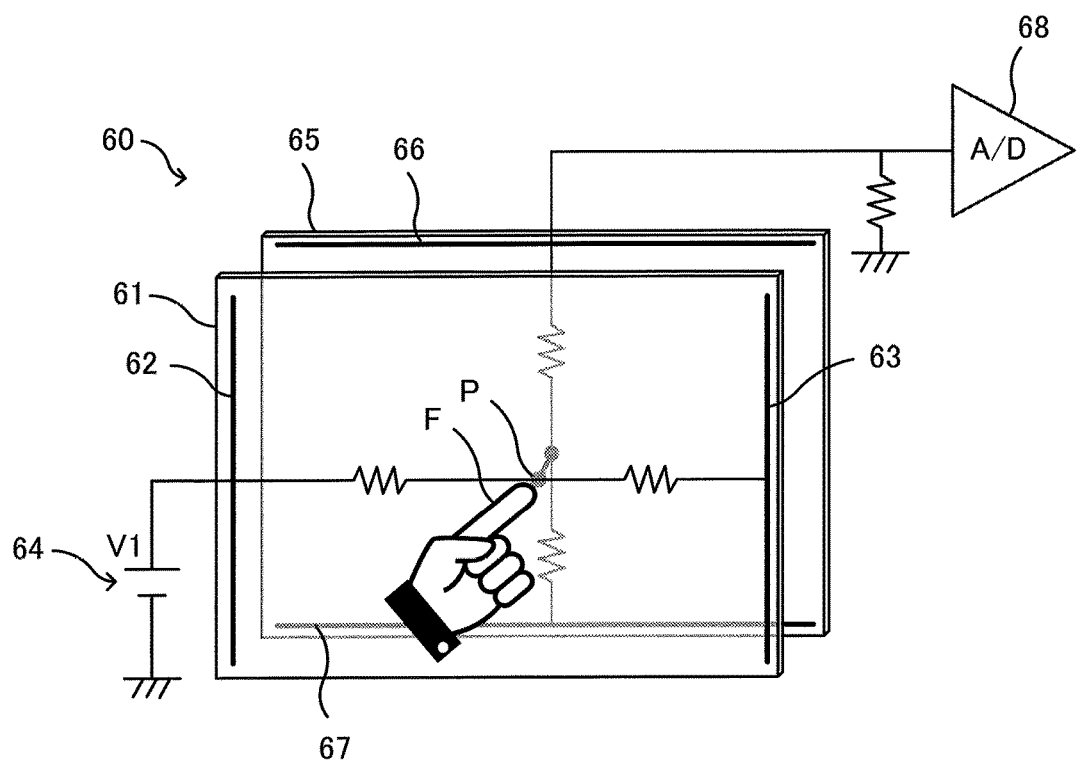
FIG. 6 is a schematic diagram illustrating a conventional resistive film-type touch panel.

To start with, a coordinate detection process of a conventional touch panel apparatus will be described. FIG. 6 is a schematic diagram illustrating a conventional resistive film-type touch panel 60. To facilitate comprehension, FIG. 6 depicts only a configuration for detecting coordinates in a horizontal direction. In the conventional resistive film-type touch panel 60 like this, a voltage source 64 is connected to a couple of electrodes 62, 63 disposed at both edges of a first resistive film 61 in the horizontal direction. Further, an analog/digital converter (A/D converter) 68 is connected to one of a couple of electrodes 66, 67 disposed at both edges of a second resistive film 65 in a vertical direction. Furthermore, an unillustrated arithmetic control unit for performing various types of arithmetic control is connected to the A/D converter 68.

After applying a voltage V1 to the electrode 62 of the first resistive film 61, and when a user's finger F touches the resistive film-type touch panel 60, the first resistive film 61 contacts the second resistive film 65, and a voltage corresponding to a touch position P on the first resistive film 61 in the horizontal direction is induced at the electrode of the second resistive film 65. Such a voltage level is analog/digital-converted by the A/D converter 68, and the arithmetic control unit detects, based on the converted digital signal, a coordinate of the touch position P in the horizontal direction.

Continuously, the first resistive film 61 remains in contact with the second resistive film 65, in which case a process of detecting a coordinate in the vertical direction is carried out. A configuration for detecting the coordinate in the vertical direction is, though not illustrated, similar to the configuration for detecting the coordinate in the horizontal direction depicted in FIG. 6, but is different in terms of such a point that the A/D converter is connected to one of the electrodes 62, 63 of the first resistive film 61, and the voltage source is connected to the electrodes 66, 67 of the second resistive film 65. Subsequently, after applying the voltage V1 to the electrode of the second resistive film 65, and when the user's finger F touches the first resistive film 61, the first resistive film 61 contacts the second resistive film 65, and a voltage corresponding to the touch position P on the second resistive film 65 in the vertical direction is induced at the electrode of the first resistive film 61. Such a voltage level is analog/digital-converted by the A/D converter 68, and the arithmetic control unit detects, based on the converted digital signal, a coordinate of the touch position P in the vertical direction.

The conventional resistive film-type touch panel 60 like this transmits merely a specific item of data, e.g., the coordinates having a comparatively small data size. Based on this, one embodiment of the present invention will be described with reference to FIGS. 1 to 5. FIG. 1 is a schematic diagram illustrating a data transmission system 1 of the present embodiment. As illustrated in FIG. 1, the data transmission system 1 of the present example includes a portable apparatus 28 and a touch panel apparatus 29. The data transmission system 1 is a system that transmits arbitrary data to the touch panel apparatus 29 by converting the arbitrary data into vibration signals and causing the portable apparatus 28 generating vibrations corresponding to a pattern of the vibration signals to contact a resistive film-type touch panel 10. According to the system like this, the arbitrary data can be transmitted to the touch panel apparatus 29 by such a simple operation as causing the portable apparatus 28 to contact the resistive film-type touch panel 10. The arbitrary data in the present example are converted into a predetermined data format, i.e., the pattern of the vibration signals, and thus transmitted to the touch panel apparatus 29, and hence there is no necessity for anxiety against a leakage of information and security. These apparatuses will hereinafter be described in sequence.

Figure 2A:
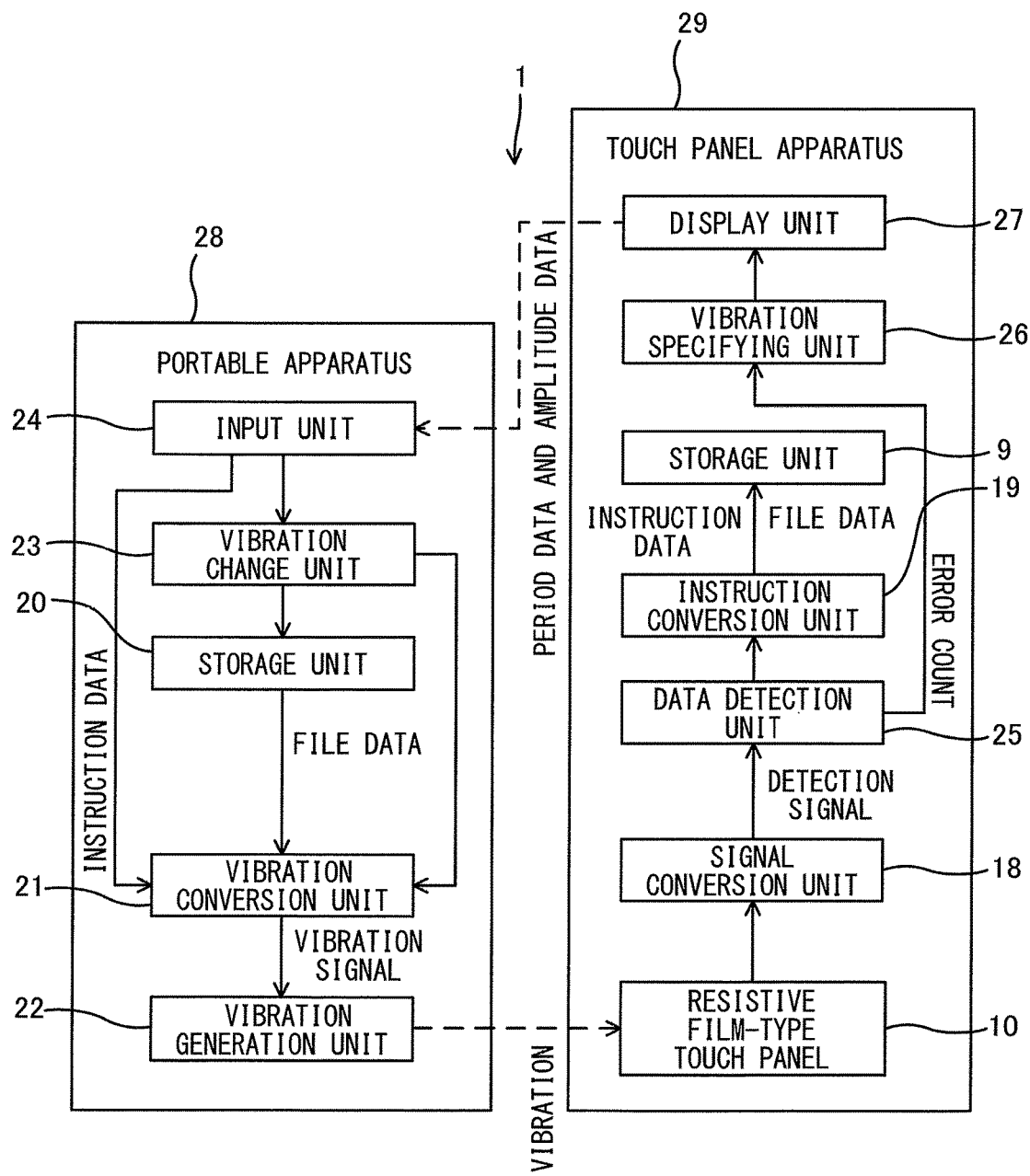
FIG. 2A is a function block diagram of the exemplary data transmission system in one embodiment of the present invention.

To begin with, the portable apparatus 28 of the present example will be described. FIG. 2A is a function block diagram of the data transmission system 1 of the present embodiment. The portable apparatus 28 includes a portable computer that generates the vibrations, e.g., a smartphone, a tablet PC, a PDA (Personal Digital Assistant) or a wearable computer. In another embodiment, the portable apparatus 28 is configured as a watch, a touch pen and other apparatuses, which are configured to generate the vibrations. The portable apparatus 28 has a storage unit 20 that stores various items of data, a vibration conversion unit 21 that converts the arbitrary data into the vibration signals, a vibration generation unit 22 that generates the vibrations corresponding to the pattern of the vibration signals, a vibration change unit 23 that changes a period or an amplitude of the vibrations, and an input unit 24 that inputs the various items of data. In-depth descriptions of these components will hereinafter be made.

The storage unit 20 in the present example includes a memory, e.g., a RAM (Random Access Memory), a ROM (Read Only Memory) or a flash memory to store a variety of file data and various categories of programs. The vibration conversion unit 21 reads the file data stored in the storage unit 20. In another embodiment, the file data are inputted to the portable apparatus 28 from an external device.

Subsequently, the vibration conversion unit 21 in the present example will be described. The vibration conversion unit 21 includes a processor, e.g., a CPU (Central Processing Unit), a DSP (Digital Signal Processor) or an FPGA (Field Programmable Gate Array), which convert the arbitrary data into the vibration signals. In an alternative embodiment, the vibration conversion unit 21 is configured as a vibration conversion program run by an unillustrated processor of the portable apparatus 28. The vibration conversion program 21, which is stored in the storage unit 20, is read from the storage unit 20 and run by the processor. The vibration conversion program 21 is provided by being recorded on a non-transitory computer readable recording medium, e.g., a CD-ROM. Details of the vibration conversion program 21 in the alternative embodiment will hereinafter be described with reference to FIG. 2B.

Figure 2B:
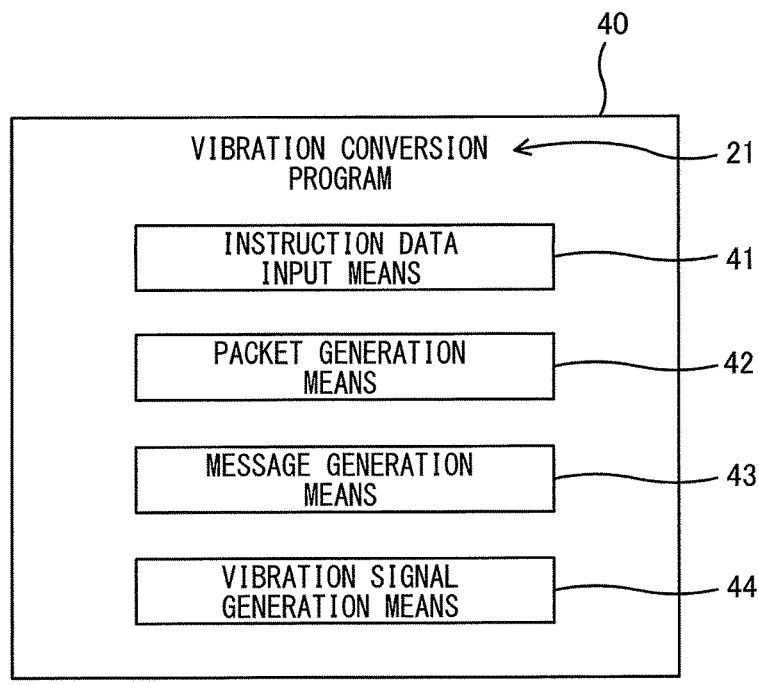
FIG. 2B is a function block diagram of an exemplary vibration conversion program recorded on a computer readable recording medium in an alternative embodiment of the present invention.

FIG. 2B is a function block diagram of the vibration conversion program 21 recorded on the computer readable recording medium of the alternative embodiment. The vibration conversion program 21 includes an instruction data input means 41 for causing the user to selectively input a predetermined instruction, a packet generation means 42 for generating a plurality of packets from the arbitrary data on the basis of a predetermined vibration pattern, a message generation means 43 for generating a message containing the plurality of packets, and a vibration signal generation means 44 for generating the vibration signals with the same message being iterated multiple times. In-depth descriptions of these components will hereinafter be made.

The instruction data input means 41 of the present example causes the user to selectively input the predetermined instruction from the input unit 24. The predetermined instruction contains a file transfer instruction for transferring a file to the touch panel apparatus 29 from the portable apparatus 28. The file transfer instruction contains, e.g., a file reception request command and a file transmission request command. In the case of the file transfer instruction, the instruction data input means 41 reads file data specified by the user from the storage unit 20 or the external device. Subsequently, the instruction data input means 41 outputs the file transfer instruction data and the file data to the packet generation means 42. On the other hand, the predetermined instruction further contains an operation instruction that is implemented by the touch panel apparatus 29. The operation instruction contains, e.g., a shutdown command, an activation command of an application, and an open command of a menu screen. In the case of the operation instruction, the instruction data input means 41 outputs only the operation instruction data to the packet generation means 42. Accordingly, "the arbitrary data" of the present specification contain not only the predetermined instruction data but also the variety of file data corresponding to the instructions.

Figure 3A:
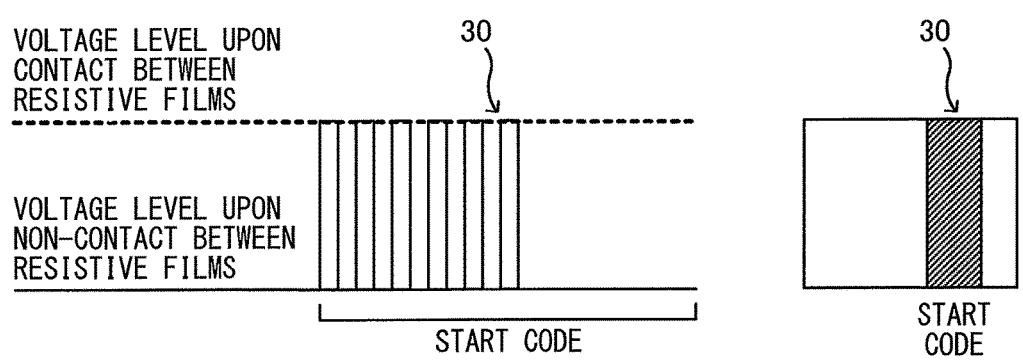
FIG. 3A is a diagram illustrating one example of a data format of a vibration signal transmitted in the exemplary data transmission system in one embodiment of the present invention, in which to show a vibration pattern corresponding to a start code indicating a start of a packet.
Figure 3B:
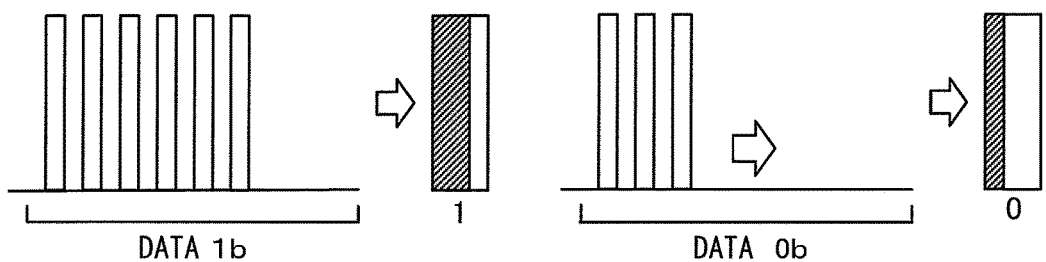
FIG. 3B is a diagram illustrating one example of the data format of the vibration signal transmitted in the exemplary data transmission system in one embodiment of the present invention, in which to show a vibration pattern corresponding to binary data used for converting arbitrary data into a vibration signal.
Figure 3C:
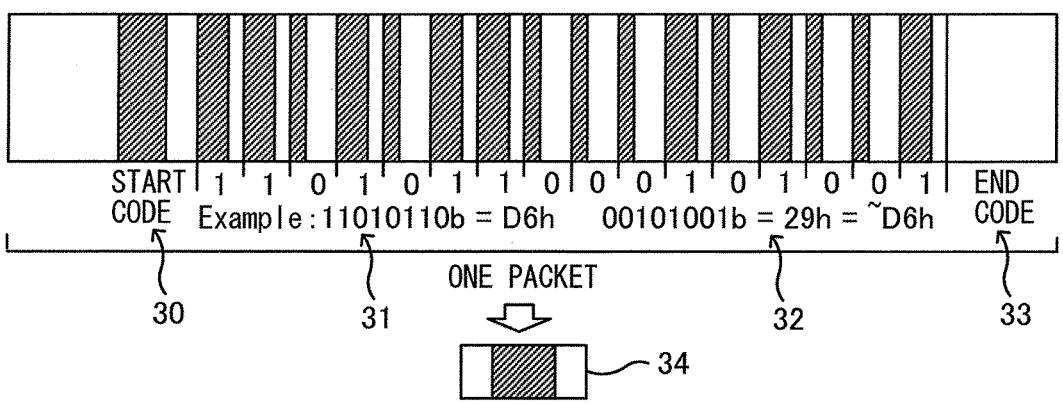
FIG. 3C is a diagram illustrating one example of the data format of the vibration signal transmitted in the exemplary data transmission system in one embodiment of the present invention, in which to show one packet containing the start code, a data body, 1's complementary data for checking and an end code.

The packet generation means 42 of the present example generates the plurality of packets from the arbitrary data inputted from the instruction data input means 41 on the basis of the predetermined vibration pattern. Herein, a packet 34 of the present example will be described in detail with reference to FIGS. 3A to 3C. FIG. 3A illustrates a vibration pattern corresponding to a start code 30 indicating a start of the packet 34. FIG. 3B illustrates a vibration pattern corresponding to binary data used for converting the arbitrary data into the vibration signals. FIG. 3C illustrates one packet 34 containing the start code 30, a data body 31, 1's complementary data 32 for checking, and an end code 33. In these drawings throughout, the axis of abscissa indicates time, and the axis of ordinate indicates amplitude of the vibration signals. As depicted in FIG. 3A, a maximum value of the amplitude of the vibration signals is equivalent to a voltage level detected when the two resistive films of the resistive film-type touch panel 10 are brought into contact with each other. While on the other hand, a minimum value of the amplitude of the vibration signals is equivalent to a voltage level detected when the two resistive films of the resistive film-type touch panel 10 are not brought into contact with each other.

As illustrated in FIG. 3A, the start code 30 indicating the start of the packet 34 corresponds to a vibration pattern containing 6 vibration periods and 4 non-vibration periods. On the other hand, the end code 33 indicating an end of the packet 34 corresponds to a vibration pattern containing, though not illustrated, 8 non-vibration periods. The packet generation means 42 adds the start code 30 corresponding to the above vibration pattern to a head of the packet 34 and the end code 33 corresponding to the above vibration pattern to a tail of the packet 34.

As depicted in FIG. 3B, the binary data "1" in the present example corresponds to a vibration pattern containing the 6 vibration periods and the 3 non-vibration periods. On the other hand, the binary data "0" in the present example corresponds to a vibration pattern containing the 3 vibration periods and the 6 non-vibration periods. The packet generation means 42 generates the 1-byte data body 31 from the arbitrary data on the basis of these vibration patterns. The predetermined instruction data in the arbitrary data is stored in the data body 31 of the first packet 34. If the predetermined instruction is the file transfer instruction, the file data are stored in the data bodies 31 of a plurality of subsequent packets 34.

As illustrated in FIG. 3C, the packet generation means 42 adds the 1's complementary data 32 for checking the data body 31 to the rear of the data body 31. Thus, one packet 34 is generated. The packet generation means 42 iterates the generation of the above-mentioned packets 34 corresponding to a byte count of the arbitrary data. The packet generation means 42 outputs the plurality of generated packets to the message generation means 43.

Figure 3D:
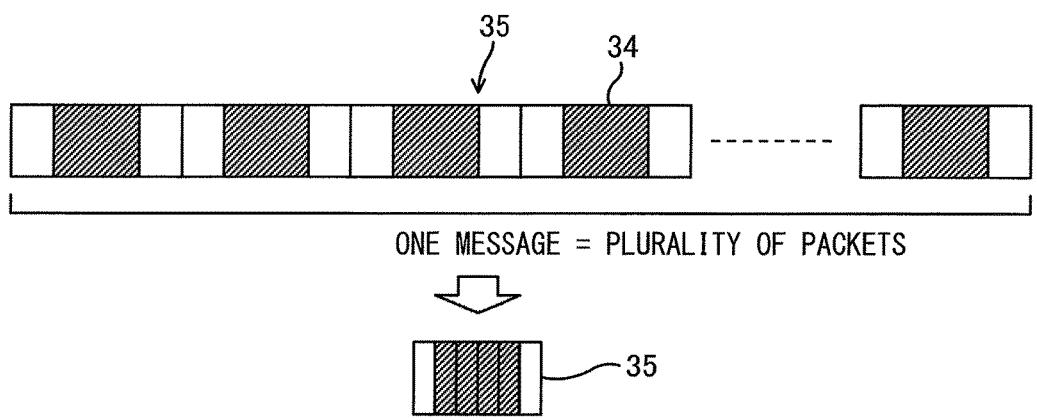
FIG. 3D is a diagram illustrating one example of the data format of the vibration signal transmitted in the exemplary data transmission system in one embodiment of the present invention, in which to show one message assembled from a plurality of packets.

Subsequently, the message generation means 43 in the present example will be described with reference to FIG. 2B. The message generation means 43 generates a message 35 containing the plurality of packets 34 generated by the packet generation means 42. FIG. 3D depicts one message 35 assembled from the plurality of packets 34. Further, the message generation means 43, though not illustrated, adds the vibration pattern indicating the start of the message 35 and containing the 8 vibration periods to the front of the plurality of packets 34, and also adds the vibration pattern indicating the end of the message 35 and containing the 8 non-vibration periods to the rear of the plurality of packets 34. The message generation means 43 outputs the generated message 35 to the vibration signal generation means 44.

Figure 3E:
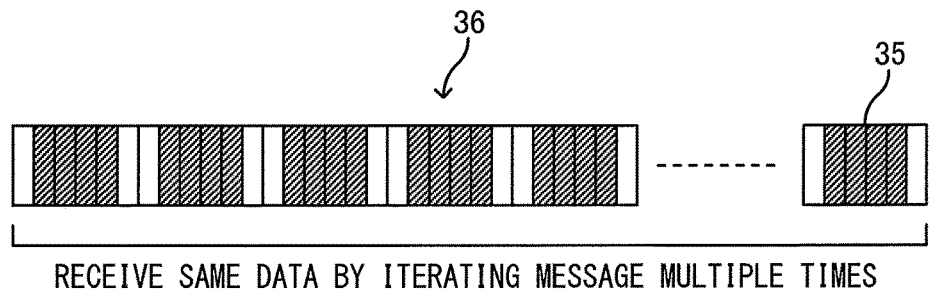
FIG. 3E is a diagram illustrating one example of the data format of the vibration signal transmitted in the exemplary data transmission system in one embodiment of the present invention, in which to show the vibration signal with the same message being iterated multiple times.

Subsequently, the vibration signal generation means 44 in the present example will be described with reference to FIG. 2B. The vibration signal generation means 44 generates a vibration signal 36 with the identical message 35 being iterated multiple times. FIG. 3E illustrates the vibration signal 36 with the identical message 35 being iterated multiple times. Moreover, the vibration signal generation means 44, though not illustrated, adds a vibration pattern indicating a start of the vibration signal 36 and containing the 8 non-vibration periods to the front of the plurality of messages 35. The generated vibration signal 36 contains, e.g., the same 8 messages 35. As will be stated later on, in such a case that the touch panel apparatus 29 cannot detect valid data from one message 35, the touch panel apparatus 29 attempts to detect the valid data from other same 7 messages. If no valid data can be detected from all other identical messages 35, a message indicating an inability to detect the data is displayed on the touch panel apparatus 29. In this case, as will be stated later on, the user sets the portable apparatus 28 to perform calibration of optimizing the period or amplitude of the vibrations. The vibration signal 36 containing the same 8 messages is transmitted to the touch panel apparatus 29, and hence multiple types of vibrations based on the identical messages 35 are inputted to the touch panel apparatus 29 simply by changing the period or the amplitude of the vibrations for each message 35. The touch panel apparatus 29 is thereby enabled to specify the optimal period or amplitude of the vibrations.

In still another embodiment, the vibration signal generation means 44 causes the user to input an iteration count of the identical message 35 from the input unit 24. In a case where there are many errors in the data detected by the touch panel apparatus 29, it is feasible to improve robustness by increasing the iteration count. While on the other hand, in a case where there are a small number of errors in the data detected by the touch panel apparatus 29, it is feasible to reduce the data size of the vibration signals 36 by decreasing the iteration count. The vibration signal generation means 44 outputs the generated vibration signal 36 to the vibration generation unit 22. In still another embodiment, the vibration signal 36 is inputted to the portable apparatus 28 from the external device.

Next, the vibration generation unit 22 of the present example will be described with reference to FIG. 2A. The vibration generation unit 22 includes a vibration generation motor for generating the vibrations corresponding to the pattern of the vibration signals 36, and a drive circuit thereof. The vibration generation motor and the drive circuit are exemplified by a stepping motor with an eccentric weight and a drive circuit that drives the stepping motor by pulse width modulation (PWM). The period or the amplitude of the vibrations generated by the vibration generation unit 22 is changed corresponding to a change of the pulse width of the vibration signal 36, such as an increase or a decrease in number of revolutions of the vibration generation motor. In still another embodiment, the vibration generation unit 22 is configured as a vibration generation piston of an electromagnetic induction type and a drive circuit of the vibration generation piston.

Subsequently, the vibration change unit 23 of the present example will be described. The vibration change unit 23 includes a processor that changes the period or the amplitude of the vibrations, such as the CPU, the DSP or the FPGA. In the alternative embodiment, the vibration change unit 23 is configured as a vibration change program 23 that is run by the unillustrated processor of the portable apparatus 28. The vibration change program 23, which is stored in the storage unit 20, is read from the storage unit 20 and run by the processor. The vibration change program 23 is provided by being recorded on the non-transitory computer readable recording medium, e.g., the CD-ROM. In yet another embodiment, the vibration change unit 23 is configured integrally with the processor or the program, which implement the vibration conversion unit 21 described above.

The vibration change program 23 is activated by the user in a calibration mode for optimizing the period or the amplitude of the vibrations. The vibration change program 23 outputs an upper limit value and a lower limit value to the vibration conversion program 21 in order to sweep the period or the amplitude of the vibrations in the vibration generation unit 22 from the upper limit value down to the lower limit value. Subsequently, the vibration conversion program 21 changes the pulse width of the vibration signal 36 for each message 35 described above. The changing of the period or the amplitude of the vibrations for each message 35 eliminates a need to iteratively transmit the same test signal. When the multiple types of vibrations changed by the vibration conversion program 21 are inputted to the touch panel apparatus 29, a below-mentioned vibration specifying unit 26 of the touch panel apparatus 29 specifies such an optimal period or amplitude of the vibrations as to minimize errors of the detected data. The optimal period or amplitude, specified by the vibration specifying unit 26, of the vibrations is displayed on a below-mentioned display unit 27 of the touch panel apparatus 29. The vibration change program 23 causes the user to input the optimal period or amplitude of the vibrations, which is displayed on the display unit 27 of the touch panel apparatus 29 via the input unit 24 of the portable apparatus 28. The vibration change program 23 outputs the inputted optimal period or amplitude of the vibrations to the vibration conversion program 21, and stores the the inputted optimal period or amplitude of the vibrations in the storage unit 20. Then, the vibration conversion program 21 changes the period or the amplitude of the vibrations generated by the vibration generation unit 22 to the optimal period or amplitude of the vibrations. Further, the vibration conversion program 21 reads and reuses the optimal period or amplitude, stored in the storage unit 20, of the vibrations in the subsequent data transmission. According to such optimization of the period or the amplitude of the vibrations, the data error detected in the touch panel apparatus 29 can be further reduced.

Subsequently, the input unit 24 of the present example will be described. The input unit 24 includes an input interface for inputting the various items of data, e.g., a touch panel, a software keyboard, a hardware keyboard, a variety of buttons, a wireless or wired interface or a combination thereof. The input unit 24 selectively inputs the predetermined instruction described above, and also selectively inputs the optimal period or amplitude of the vibrations described above. If the input unit 24 is a wireless interface, the input unit 24 automatically inputs data of the optimal period or amplitude of the vibrations described above to the portable apparatus 28 from the touch panel apparatus 29 through wireless communications. The automatic input of the optimal period or amplitude of the vibrations leads to complete automation of the calibration without any decline in security.

Next, the touch panel apparatus 29 of the present example will be described with reference to FIG. 2A. The touch panel apparatus 29 includes: the resistive film-type touch panel 10 inputting the vibrations upon receiving the contact of the portable apparatus 28; a signal conversion unit 18 that converts, into a detection signal, a voltage level detected corresponding to the contact and the non-contact between two resistive films 11, 15 of the resistive film-type touch panel 10 based on the inputted vibrations; a data detection unit 25 that detects the data on the basis of a detection signal pattern; the vibration specifying unit 26 that specifies such a period or amplitude of the vibrations as to minimize the data error detected by the data detection unit 25; the display unit 27 that displays the various items of data; an instruction conversion unit 19 that converts the data detected by the detection unit 25 into a predetermined instruction; and a storage unit 9 that stores the various items of data. The vibrations inputted to the touch panel apparatus 29 are detected in two states suited to computer processing, such as the contact and the non-contact between the two resistive films 11, 15 of the resistive film-type touch panel 10, i.e., detected by a non-linear signal similar to a digital signal, and are therefore smaller in noise than in the case of detecting whole vibrations by a linear analog signal, resulting in a decrease in data error detected by the touch panel apparatus 29. In-depth descriptions of the components of the touch panel apparatus 29 will hereinafter be made.

The resistive film-type touch panel 10 of the present example includes, as illustrated in FIG. 1, the first resistive film 11 and the second resistive film 65 that are spaced at a predetermined distance. A couple of electrodes 12, 13 are disposed at both edges of the first resistive film 11 in the horizontal direction, and a couple of electrodes 16, 17 are disposed at both edges of the second resistive film 15 in the vertical direction. Further, a voltage source 14 is disposed in extension to the electrodes 12, 13 of the first resistive film 11. In yet another embodiment, the voltage source is disposed in extension to the electrodes 16, 17 of the second resistive film 15.

Subsequently, the signal conversion unit 18 of the present example will be described with reference to FIG. 1. The signal conversion unit 18 includes an A/D converter or a pulse converter that converts, into the detection signal, the voltage level detected corresponding to the contact and the non-contact between the two resistive films 11, 15 of the resistive film-type touch panel 10 based on the inputted vibrations. The signal conversion unit 18 is connected to one of the electrodes 16, 17 of the second resistive film 15. In yet another embodiment, the signal conversion unit 18 is connected to one of the electrodes 12, 13 of the first resistive film 11.

Next, the data detection unit 25 of the present example will be described with reference to FIG. 2A. The data detection unit 25 includes a processor that detects the arbitrary data based on the pattern of the detection signal converted by the signal conversion unit 18, such as the CPU, the DSP or the FPGA. In the alternative embodiment, the data detection unit 25 is configured as a data detection program that is run by the unillustrated processor of the touch panel apparatus 29. The data detection program 25 is stored in the storage unit 9 of the touch panel apparatus 29, and is read from the storage unit 9 and run by the processor.

The data detection program 25 is provided by being recorded on the non-transitory computer readable recording medium, e.g., the CD-ROM.

The pattern of the detection signal detected by the data detection unit 25 of the present example is the same as the aforementioned pattern of the vibration signal 36 illustrated in FIGS. 3A to 3E. First, the data detection unit 25, after detecting that the portable apparatus 28) contacts the resistive film-type touch panel 10, detects no voltage in the electrode 16 of the second resistive film 15 continuously for a fixed period of time, i.e., detects 8 non-vibration periods indicating the start of the detection signal 36 (vibration signal 36). The data detection unit 25 thereby changes over the process to the data detection process in the present example from the coordinate detection process defined as a normal operation of the touch panel apparatus 29. Subsequently, the data detection unit 25 detects the voltage in the electrode 16 of the second resistive film 15 continuously for the fixed period of time, i.e., detects 8 vibration periods indicating the start of the message 35. The data detection unit 25 thereby starts detecting the data from one message 35. When unable to detect the 8 vibration periods indicating the start of the message 35, the data detection process is finished.

Subsequently, the data detection unit 25 detects the start code 30 of the packet 34. In the case of detecting the start code 30, the data detection unit 25 reads the data by 2 bytes, and computes the exclusive OR (XOR) between the data body 31 and the 1's complementary data 32 for checking, thereby detecting the valid data body 31. In the case of detecting the valid data body 31, the data detection unit 25 detects the end code 33 of the packet 34. In the case of detecting the end code 33 of the packet 34, the data detection of one packet 34 is completed. Thus, a series of elements 30 to 33 of the packet 34 are detected with no error, thereby completing the data detection of one packet 34. The data detection unit 25 fetches the valid data body 31 into a buffer and outputs the valid data body 31 to the instruction conversion unit 19. Next, the data detection unit 25 executes the data detection of a subsequent packet 34 until the 8 non-vibration periods indicating the end of the message 35 are detected. In the case of detecting the 8 non-vibration periods indicating the end of the message 35, the data detection of the subsequent message 35 is executed.

The data detection unit 25, when unable to detecting any element of the start code 30, the data body 31 and the end code 33 of one packet 34, counts detection errors of the data, and executes the data detection from another identical message 35. Thus, if the valid data cannot be detected from one message 35 in the touch panel apparatus 29, it is feasible to attempt to detect the valid data from another identical message 35.

While on the other hand, if the valid data cannot be detected from all other identical messages 35, the data detection unit 25 displays a message indicating an inability to detect the data on the display unit 27. In this case, as described above, the user activates the vibration change program 23 in order to cause the portable apparatus 28 to implement the calibration for optimizing the period or the amplitude of the vibrations. When the multiple types of vibrations changed by the vibration change program 23 are inputted to the touch panel apparatus 29, the data detection unit 25 detects, as described above, the data on the basis of the pattern of the vibration signal 36. As stated above, the period or the amplitude of the vibrations, i.e., the pulse width of the vibration signal 36 is changed for each identical message 35. The data detection unit 25 outputs, to the vibration specifying unit 26, a count value of the detection errors corresponding to the period data or the amplitude data of the multiple types of vibrations, and a count value of the detection errors corresponding to the period or the amplitude of the multiple types of vibrations.

Next, the vibration specifying unit 26 of the present example will be described with reference to FIG. 2A. The vibration specifying unit 26 includes the processor, e.g., the CPU, the DSP or the FPGA, that specifies such a period or amplitude as to minimize the data error detected by the data detection unit 25 in the calibration mode of optimizing the period or the amplitude of the vibrations. In the alternative embodiment, the vibration specifying unit 26 is configured as a vibration specifying program that is run by the unillustrated processor of the touch panel apparatus 29. The vibration specifying program 26 is stored in the storage unit 9 of the touch panel apparatus 29, and is read from the storage unit 9 and run by the processor. The vibration specifying program 26 is provided by being recorded on the non-transitory computer readable recording medium, e.g., the CD-ROM. In yet another embodiment, the vibration specifying unit 26 is configured integrally with the processor or the program, which implement the data detection unit 25.

The vibration specifying unit 26 of the present example specifies such a period or amplitude as to minimize the data error detected by the data detection unit 25 on the basis of the count value of the detection errors corresponding to the period data or the amplitude data of the multiple types of vibrations, and the count value of the detection errors corresponding to the period or the amplitude of the multiple types of vibrations. Subsequently, the vibration specifying unit 26 displays the optimal period or amplitude of the vibrations on the display unit 27. Further, the vibration specifying unit 26 stores the optimal period or amplitude of the vibrations in the storage unit 9, and, in the subsequence data transmission, reads the optimal period data or amplitude data of the vibrations from the storage unit 9 and displays the optimal period data or amplitude data on the display unit 27. In yet another embodiment including the wireless interface in the touch panel apparatus 29, the optimal period data or amplitude data of the vibrations are transferred to the portable apparatus 28 from the touch panel apparatus 29 through the wireless communications. The calibration like this is thereby completely automated without any decline in security.

Subsequently, the display unit 27 of the present example will be described. The display unit 27 is disposed on a lower layer of the resistive film-type touch panel 10, and includes a display device for displaying the various items of data, such as a liquid crystal display, an organic EL display and a plasma display. The display unit 27 displays the message indicating that the data detection unit 25 has been unable to detect the data, and the optimal period or amplitude of the vibrations, which are specified by the vibration specifying program 26. The user inputs the optimal period or amplitude of the vibrations displayed on the display unit 27 to the input unit 24 according to the vibration change program 23 of the portable apparatus 28.

Subsequently, the instruction conversion unit 19 of the present example will be described. The instruction conversion unit 19 includes the processor, e.g., the CPU, the DSP or the FPGA, that converts the data detected by the data detection unit 25 into a predetermined instruction. In the alternative embodiment, the instruction conversion unit 19 is configured as an instruction conversion program that is run by the unillustrated processor of the touch panel apparatus 29. The instruction conversion program 19 is stored in the storage unit 9 of the touch panel apparatus 29, and is read from the storage unit 9 and run by the processor. The instruction conversion program 19 is provided by being recorded on the non-transitory computer readable recording medium, e.g., the CD-ROM.

The instruction conversion program 19 converts, into the predetermined instruction, the data body 31 of the first packet 34 of the data detected by the data detection unit 25. If the predetermined instruction is the file transfer instruction, the instruction conversion program 19 stores, in the storage unit 9, the data body 31 of the subsequent packet 34 of the data detected by the data detection unit 25 as file data. On the other hand, if the predetermined instruction is the operation instruction, e.g., an activation command of the application, the instruction conversion program 19 activates the specified application. On this occasion, the instruction conversion program 19 stores an operation log on the storage unit 9.

Subsequently, the storage unit 9 of the present example will be described. The storage unit 9 includes a memory, e.g., a RAM (Random Access Memory), a ROM (Read Only Memory) or a flash memory to store a variety of file data and various categories of programs. If the predetermined instruction is the file transfer instruction, the storage unit 9 stores the file data transferred from the portable apparatus 28. On the other hand, if the predetermined instruction is the operation instruction, the storage unit 9 stores the operation log.

Figure 4:
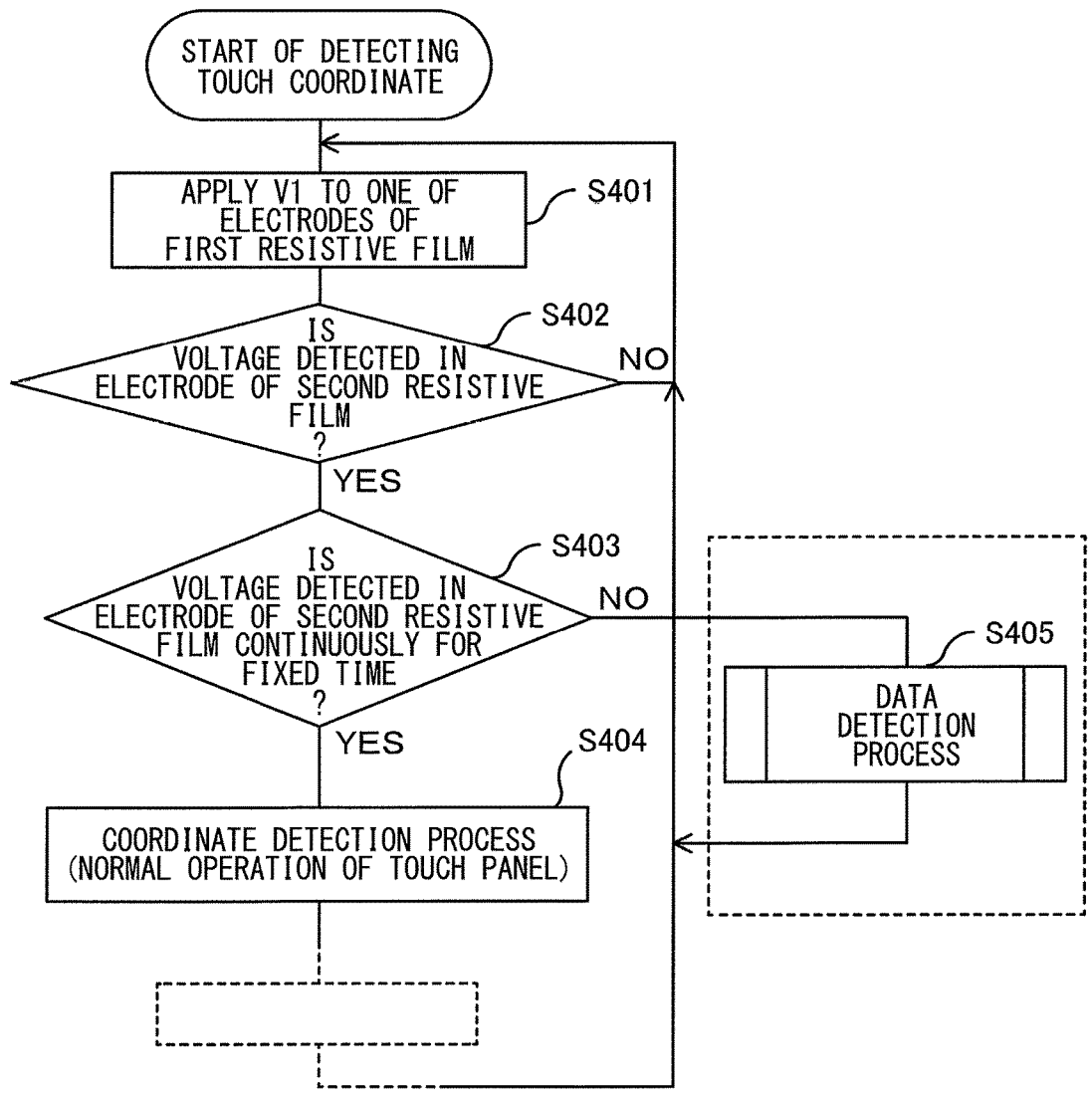
FIG. 4 is a flowchart illustrating one example of a coordinate detection process of the touch panel apparatus in one embodiment of the present invention.
Figure 5:
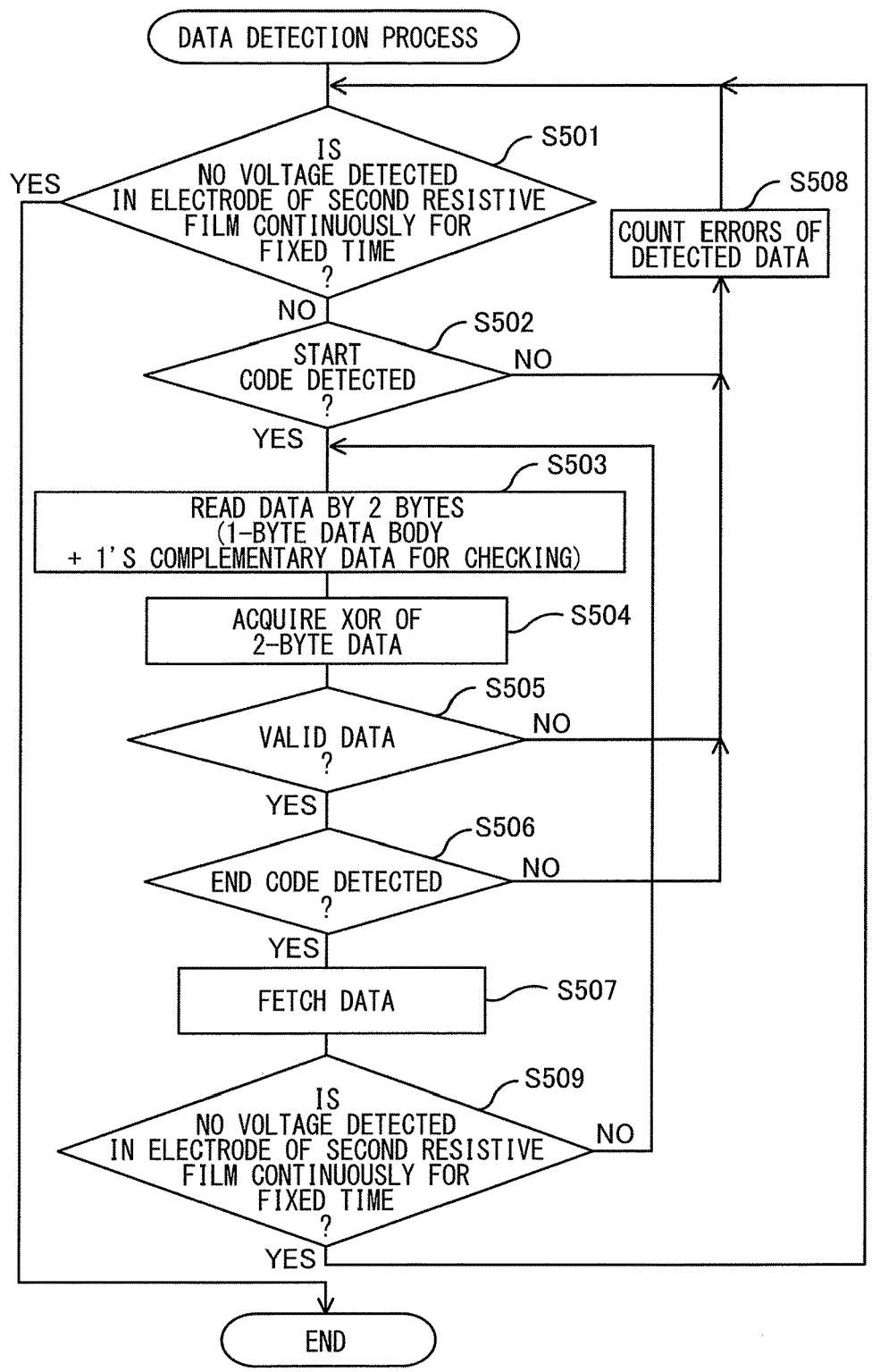
FIG. 5 is a flowchart illustrating one example of a data detection process of the touch panel apparatus in one embodiment of the present invention.

Next, processes of the touch panel apparatus 29 of the present embodiment will be described with reference to FIGS. 4 and 5. FIG. 4 is a flowchart illustrating one example of the processes of the touch panel apparatus 29 of the present embodiment, and FIG. 5 is a flowchart illustrating one example of the data detection process of the touch panel apparatus 29 of the present embodiment. As illustrated in FIG. 4, first, in step S401, the voltage V1 is applied to one electrode, i.e., the electrode 12 of the first resistive film 11. Next, in step S402, the voltage is detected in the electrode 16 of the second resistive film 15, i.e., it is detected that the portable apparatus 28 contacts the resistive film-type touch panel 10. When the voltage is not detected in the electrode 16 of, the second resistive film 15 in step S402 (NO in step S402), i.e., when the portable apparatus 28 does not contact the resistive film-type touch panel 10, the process returns to step S401. Whereas when the voltage is detected in the electrode 16 of the second resistive film 15 in step S402 (YES in step S402), i.e., when the portable apparatus 28 contacts the resistive film-type touch panel 10, the process advances to step S403.

In step S403, the voltage is not detected in the electrode 16 of the second resistive film 15 continuously for the fixed period of time, i.e., the 8 non-vibration periods indicating the start of the detection signal 36 are detected. When the voltage is detected in the electrode 16 of the second resistive film 15 continuously for the fixed period of time (YES in step S403), i.e., when the start of the detection signal 36 is not detected, the process advances to step S404, in which the coordinate detection process is executed as the normal operation of the touch panel. Whereas when the voltage is not detected in the electrode 16 of the second resistive film 15 continuously for the fixed period of time (NO in step S403), i.e., when the start of the detection signal 36 is detected, the process advances to step S405, in which the data detection process illustrated in FIG. 5 is executed.

Next, one example of the data detection process of the present example of the touch panel apparatus 29 will be described with reference to FIG. 5. To start, in step S501, the voltage is not detected in the electrode 16 of the second resistive film 15 continuously for the fixed period of time, i.e., the 8 vibration periods indicating the start of the message 35 are detected. When the voltage is not detected in the electrode 16 of the second resistive film 15 continuously for the fixed period of time (YES in step S501), i.e., when the start of the message 35 is not detected, the data detection process is finished, and the process returns to step S401 in FIG. 4. Whereas when the voltage is detected in the electrode 16 of the second resistive film 15 continuously for the fixed period of time (NO in step S501), i.e., when the start of the message 35 is detected, the process advances to step S502. Subsequently, in step S502, the start code 30 indicating the start of the packet 34 is detected. When the start code 30 is not detected (No in step S502), the detection errors of the data are counted in step S508. The count value of the detection errors is used in the calibration mode for optimizing the period or the amplitude of the vibrations. Next, the process returns to step S501 to perform a trial of the data from another identical message 35. Whereas when the start code 30 is detected (YES in step S502), the process advances to step S503.

Subsequently, in step S503, the data equivalent to 2 bytes, i.e., the data body (1 byte of the head) and the 1's complementary data (1 byte subsequent thereto) for checking are read. Next, in step S504, the data equivalent to 2 bytes, i.e., the exclusive OR (XOR) between the data body 31 and the 1's complementary data 32 for checking is computed. Next, the validity of the data is detected based on a result of the XOR of step S505. When the data are invalid, the process advances to step S508, in which the detection errors of the data are counted. Subsequently, the process returns to step S501 to perform the trial of the data detection from another identical message 35. Whereas when the data are valid (YES in step S505), the process advances to step S506.

Next, in step S506, the end code 33 indicating the end of the packet 34 is detected. When the end code 33 is not detected (NO in step S506), the detection errors of the data are counted in step S508. Subsequently, the process returns to step S501 to perform the trial of the data detection from another identical message 35. Whereas when the end code 33 is detected (YES in step S506), the process advances to step S507. In step S507, the detected data are fetched.

Subsequently, in step S509, the voltage is not detected in the electrode 16 of the second resistive film 15 continuously for the fixed period of time, i.e., the 8 non-vibration periods indicating the end of the message 35 are detected. When the voltage is detected in the electrode 16 of the second resistive film 15 continuously for the fixed period of time (NO in step S509), i.e., when the end of the message 35 is not detected, it follows that the start code 30 of the subsequent packet 34 is detected, and hence the process advances to step S503, in which the data of the subsequent packet 34 are detected. Whereas when the voltage is not detected in the electrode 16 of the second resistive film 15 continuously for the fixed period of time (YES in step S509), i.e., when the end of the message 35 is detected, the process returns to step S501, in which the 8 vibration periods indicating the start of the message 35 are detected. Then, the data detection process is iterated. When the start of the message 35 is not detected (YES in step S501), the data detection process is finished.

Herein, an operational effect of the data transmission system 1 of the present embodiment will be described. According to the data transmission system 1 of the present example, the arbitrary data can be transmitted to the touch panel apparatus 29 by such a simple operation as to bring the portable apparatus 28 into contact with the resistive film-type touch panel 10. Further, the arbitrary data are, after being converted into the non-universal data format, i.e., into the pattern of the vibration signals 36, transmitted to the touch panel apparatus 29, and hence there is no necessity for anxiety against the leakage of information the security. Furthermore, the vibrations inputted to the touch panel apparatus 29 are detected in the form of having two states suited to the computer processing such as the contact and the non-contact of the two resistive films 11, 15 of the resistive film-type touch panel 10, i.e., detected as the non-linear signals similar to the digital signals, and therefore the noise is reduced as compared with the touch panel that detects all vibrations as the linear analog signals, resulting in a decrease in error of the data detected by the touch panel apparatus 29. Accordingly, it is feasible not only to transmit the arbitrary data to the touch panel apparatus 29 from the portable apparatus 28 easily and safely, but also to reduce the error of the data detected by the touch panel apparatus 29.

Moreover, the period or the amplitude of the vibrations inputted to the touch panel apparatus 29 from the portable apparatus 28 is optimized, and hence the error of the data detected by the touch panel apparatus 29 is further reduced.

Further, the vibration signals 36 with the identical message 35 being iterated multiple times are transmitted to the touch panel apparatus 29, and it is therefore possible to change the period or the amplitude of the vibrations for each message 35. In this case, it is unnecessary to iteratively transmit the same test signal. Furthermore, if the touch panel apparatus 29 is unable to receive valid data from the message 35, it is feasible to perform the trial of detecting the valid data from another identical message 35. It is therefore unnecessary for the touch panel apparatus 29 to request that the portable apparatus 28 retransmit the message 35.

Although the variety of embodiments have been described so far in the present specification, the present invention is not limited to the variety of embodiments described above, and it shall be recognized that multiple changes and modifications can be implemented within the range described in the scope of claims for patent that follow.

What is claimed is:

1. A data transmission system configured to transmit data via a touch panel capable of detecting vibrations, comprising:
   a portable apparatus including:
      a portable apparatus processor configured to convert arbitrary data into a vibration signal, and change a period or an amplitude of the vibration signal, and
      a motor configured to generate vibrations corresponding to a pattern of the vibration signal, the vibrations vibrating the portable apparatus; and
   a touch panel apparatus including:
      a resistive film-type touch panel inputting the vibrations upon coming into physical contact with the vibrating portable apparatus,
      a pulse converter configured to convert, into a detection signal, a voltage level detected corresponding to a contact and a non-contact between resistive films of the resistive film-type touch panel based on the inputted vibrations, and
      a touch panel apparatus processor configured to detect the data based on a pattern of the detection signal, and configured to specify a period or amplitude of the vibrations so as to minimize errors of the detected data in a plurality of types of vibrations changed by the portable apparatus processor.

2. The data transmission system according to claim 1, wherein the portable apparatus processor generates a plurality of packets from the arbitrary data, based on a predetermined vibration pattern, generates a message containing the plurality of packets, and generates the vibration signal with the same message being iterated multiple times.

3. The data transmission system according to claim 2, wherein the portable apparatus processor changes the period or the amplitude of the vibrations for each message.

4. The data transmission system according to claim 2, wherein the touch panel apparatus processor performs, when unable to detect valid data from the message, a trial of detecting the valid data from another identical message.

5. A touch panel apparatus configured to detect data via a touch panel capable of detecting vibrations, comprising:
   a resistive film-type touch panel inputting the vibrations upon coming into physical contact with a vibrating portable apparatus, the vibrations having a vibration pattern corresponding to arbitrary data;
   a pulse converter configured to convert, into a detection signal, a voltage level detected corresponding to a contact and a non-contact between resistive films of the resistive film-type touch panel based on the inputted vibration;
   a processor configured to detect the data based on a pattern of the detection signal, and specify a period or amplitude of the vibrations so as to minimize errors of the detected data in a plurality of types of vibrations.

6. A data transmission method for transmitting data via a touch panel capable of detecting vibrations, comprising:
   a step of causing a portable apparatus to convert arbitrary data into a vibration signal, and to generate vibrations corresponding to a pattern of the vibration signal, the vibrations vibrating the portable apparatus;
   a step of inputting the vibrations to a resistive film-type touch panel by bringing the portable apparatus into physical contact with the resistive film-type touch panel;
   a step of converting, into a detection signal, a voltage level detected corresponding to a contact and a non-contact between resistive films of the resistive film-type touch panel based on the inputted vibrations from the vibrating portable apparatus;
   a step of detecting the data based on a pattern of the detection signal;
   a step of changing a period or an amplitude of the vibrations; and
   a step of specifying a period or amplitude of the vibrations so as to minimize errors of the detected data in a plurality of types of the changed vibrations.

* * * * *